United States Patent Office 3,632,692
Patented Jan. 4, 1972

3,632,692
ORGANOPHOSPHORUS ANHYDRIDES
Juan G. Morales, Modesto, Calif., assignor to Shell
Oil Company, New York, N.Y.
No Drawing. Filed July 21, 1967, Ser. No. 654,973
Int. Cl. C07f 9/02; A01n 9/36
U.S. Cl. 260—933                                     3 Claims

ABSTRACT OF THE DISCLOSURE

Enol phosphate anhydrides that can be reacted with alcohols to produce enol phosphates active as insecticides and/or anthelmintics.

DESCRIPTION OF THE PRIOR ART

Dialkyl beta-halogen-substituted-vinyl phosphates are a known class of compounds (U.S. Patent 2,956,073), known to be active insecticides and/or anthelmintics (U.S. Patent 3,116,201; Canadian Patent 731,113). It has been found that such phosphates, in which one alkyl group is methyl, and the other is higher alkyl of particular configurations, are superior insecticides (U.S. Patent 3,299,190) and/or anthelmintics (copending applications Ser. Nos. 654,985 and 654,993, now U.S. Patent 3,536,791).

As shown in U.S. 2,956,073 and U.S. 3,299,190, the mixed esters are conventionally prepared by reacting the appropriate alpha-polyhaloaldehyde with the appropriate dimethyl alkyl phosphite. Thus, for example, to prepare methyl butyl 2,2-dichlorovinyl phosphate, chloral would be reacted with dimethyl butyl phosphite. This procedure has several operational drawbacks. First, it is necessary to prepare the mixed phosphite, which is difficult to prepare and isolate, since in the conventional methods for preparing mixed phosphites, $(RO)_2P(OR_1)$, the final product inevitably appears to be a mixture of all of the possible phosphites:

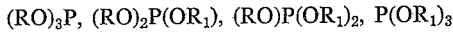

resulting in lower yield of desired product and difficulty in isolating it. Further, the mixed phosphites must be kept free from all moisture, since even minute amounts of water appear to cause rapid disproportionation into the other possible phosphites. Use of the mixed phosphite requires special precautions to avoid contamination of the phosphite reactant, and the reaction mixture, by even minute amounts of water. Still further, in the reaction of the mixed phosphite with the haloaldehyde, special precaution must be taken to avoid elimination of the higher alkyl group, rather than the methyl group.

SUMMARY OF THE INVENTION

An operationally simple and effective method for preparing the mixed esters, requiring no more than ordinary care in conducting the operations involved, and yielding the desired product in high conversion and yield, now has been discovered.

This process comprises reacting the anhydride, P,P'-di(2,2-dichlorovinyl) P,P'-dimethyl pyrophosphate, with the appropriate alkyl alcohol to form the corresponding methyl higher-alkyl 2,2-dichlorovinyl phosphate.

Further, it has been found that this reaction is a general reaction of enol phosphate anhydrides, such anhydrides reacting with alcohols generally to form the corresponding diester enol phosphates. Since these product phosphates also are insecticides and/or anthelmintics, and their preparation is subject to the same problems as the preparation of the methyl higher-alkyl 2,2-dichlorovinyl phosphates, these discoveries provide a useful, effective method for preparing valuable mixed dialkyl enol phosphate esters.

Further, the anhydride precursors are readily prepared by the method of Mason and Todd, Journal of the Chemical Society, 1951, 2267 or by the method of Khorana and Todd, Journal of the Chemical Society, 1953, 2257. According to the former method, the enol phosphate partial ester or alkali metal (preferably sodium) salt thereof is reacted with thionyl chloride. According to the latter method, the partial ester is reacted with a carbodiimide such as dicyclohexylcarbodiimide. These methods, too, appear to be generally applicable, except that in the case of enol phosphates which contain a moiety—such as an amido or aralkyl ester moiety—that is independently reactive with thionyl chloride, the first method of course cannot be used. Where it can be used, the thionyl chloride method generally will be found to be preferable, since the reagent used to effect formation of the anhydride is more readily available, and is cheaper, and the thionyl chloride method is usually operationally simpler in some respects.

This invention accordingly has two general aspects:
(a) Novel enol phosphate anhydrides, precursors for the preparation of other enol phosphates, some novel, some known, which are valuable insecticides and/or anthelmintics;
(b) A method for preparing enol phosphate products, by reacting the anhydrides with appropriate alcohols.

DESCRIPTION OF THE PREFERRED EMBODIMENTS

Judging from the available information, four general classes of enol phosphates are of most interest as insecticides and/or anthelmintics. These classes are conveniently decribed by the formulae:

(I) 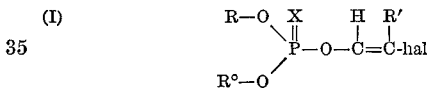

wherein R is alkyl containing from one to four carbon atoms and R° is alkyl, alkenyl or substituted alkyl, R° being different from R, R' is hydrogen or middle halogen, and hal is middle halogen (that is, chlorine or bromine), X is oxygen or sulfur, preferably oxygen. Of particular interest are the products in which R° is alkyl or alkyl substituted by from one to a plurality of halogen, particularly chlorine, and those in which R° is alkyl substituted by alkoxy, alkoxy containing one or more oxy (—O—) linkages, or carboalkoxy.

(II) 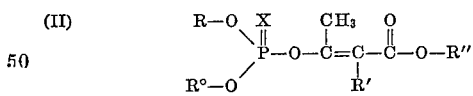

wherein R" is alkyl, phenyl, phenalkyl or substituted phenalkyl and, the other symbols have the respective meanings already given. In the phenalkyl moiety, it is preferred that the alkylene portion contain no more than four carbon atoms, with the phenyl portion being linked to the oxygen atom to which the R" group is attached by from one to two of the alkylene carbon atoms. Of particular interest are the compounds wherein R" represents phenalkyl wherein the phenyl group is substituted by from one to a plurality of substituents such as halogen, particularly middle halogen (bromine and chlorine), nitro, cyano, lower alkyl, lower alkoxy, mercapto (—SH), lower alkylthio, lower akylsulfinyl, lower akylsulfonyl or the like.

(III) 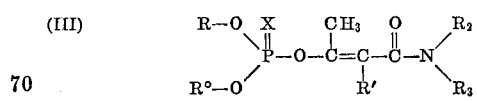

wherein $R_2$ and $R_3$ each is hydrogen, lower alkyl, lower alkoxy, lower alkoxyalkyl, phenyl or substituted phenyl, wherein the phenyl group is substituted by from one to a plurality of substituents such as halogen, particularly middle halogen (bromine and chlorine), nitro, cyano, lower alkyl, lower alkoxy, mercapto (—SH), lower alkylthio, lower alkylsulfinyl, lower alkylsulfonyl or the ilke, and the other symbols have the respective meanings already given.

(IV) 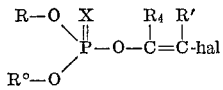

wherein $R_4$ is substituted phenyl, X is oxygen or sulfur, and the other symbols have the respective meanings already given. In the substituted phenyl group, $R_4$, the substituent(s) preferably is (are) halogen; optionally, the phenyl ring also may be substituted by nitro.

The four classes of anhydrides required to prepare these enol phosphates would have the respective formulae (employing the same symbols):

(V) 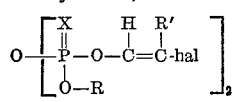

(VI) 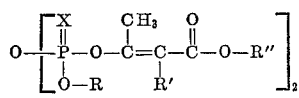

(VII) 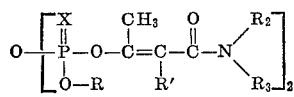

(VIII) 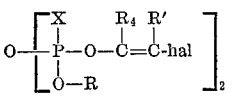

These anhydrides in turn would be prepared from partial ester enol phosphates or alkali metal salts thereof of the respective formulae (employing the same symbols, and wherein M represents hydrogen or an alkali or alkaline earth metal):

(IX) 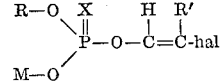

(X) 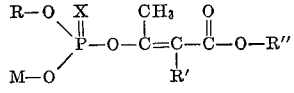

(XI) 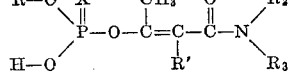

(XII) 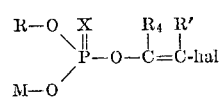

by reaction with an alcohol, R°—OH.

In many cases, these partial esters and salts are known compounds. They, and the others that are not known, are readily prepared from known dialkyl enol phosphates. Thus, the alkali metal salts are readily prepared by treating the dialkyl enol phosphate with an alkali metal or alkaline earth metal iodide, or in some cases choride (calcium chloride), in a suitable solvent, and the partial ester then prepared from the salt by treating a solution of the salt with hydrogen chloride, then separating the organic phase from the resulting alkali metal chloride.

Dialkyl enol phosphates suitable for preparations of salts and partial esters of Formula IX are disclosed in U.S. Patent 2,956,073. Dialkyl enol phosphates suitable for preparation of salts and partial esters of Formula X are disclosed in U.S. Pats. 2,685,552; 2,982,686. Dialkyl enol phosphates suitable for preparation of partial esters of Formula XI are disclosed in U.S. Pats. 2,802,855; 2,908,605; 3,258,394. Dialkyl enol phosphate suitable for preparation of salts and partial esters of Formula XII are disclosed in U.S. Pats. 3,003,916; 3,102,842.

When preparing the anhydride via the thionyl chloride method, the reaction is in many cases conveniently conducted by slowly adding and mixing the partial ester or salt of the enol phosphate precursor with a large excess of thionyl chloride, maintaining the reaction mixture temperature at about 40–50° C., then refluxing the mixture for from 3 to 5 hours, and then stripping off the excess thionyl chloride. The crude product then is worked up by conventional distillation procedures. When the precursor is a partial ester or salt of Formula X, and R″ represents a phenalkyl group, the thionyl chloride can attack the phenalkyl group as well as the M—O— group. In such a case, it is desirable to employ a separate solvent (benzene is suitable) and a carefully controlled amount of thionyl chloride, not exceeding the theoretical, to maintain the undesired side-reaction to a minimum.

Where the carbodiimide route is employed, the partial ester is mixed with, preferably, dicyclohexylcarbodiimide in slight excess, in the presence of a suitable solvent, at a temperature of about 30–50° C., the solid N,N′-dicyclohexyl urea by-product is separated and the product recovered by stripping off the solvent, then purifying the product by conventional recrystallization procedures. Suitable solvents include benzene, acetonitrile, dimethyl formamide, dioxane.

The reaction of the anhydride with the alcohol proceeds according to the schematic equation (wherein the symbols have the respective meanings already given):

$$\left[ \begin{array}{c} X \\ \| \\ O-\!\!-\!\!P-O-C=C \\ | \\ O-R \end{array} \right]_2 + 2R°-O-H \longrightarrow$$

$$\begin{array}{c} R-O \\ \diagdown \| \\ P-O-C=C \\ \diagup \\ R°-O \end{array} \;+\; \begin{array}{c} R-O \\ \diagdown \| \\ P-O-C=C \\ \diagup \\ H-O \end{array}$$

This reaction can be carried out by one of two general techniques, the particular technique used being suited to convenience in recovering the desired product. When the alcohol is relatively low-boiling ($C_{4-6}$ alcohol), it is most convenient to employ a small excess of the alcohol, since it can be removed readily from the final reaction mixture by distilling the mixture. The distilled mixture then is treated with an organic solvent—methylene chloride is quite suitable—and an aqueous solution of a base—sodium bicarbonate is quite suitable—to give a basic mixture. Under these circumstances, the acid by-product is converted to the sodium salt, which is in the aqueous phase, while the ester product is in the organic solvent phase, from which it can be recovered by distillation, and purified by conventional techniques.

When the alcohol is relatively high-boiling ($C_{7-12}$ alcohol), it is most convenient to employ a slight excess of the pyrophosphate. In this case, no distillation step is required—all that is necessary is to employ the extraction/neutralization procedure, since the excess pyrophosphate is converted by the base to the sodium salt.

By "slight excess" is meant, in both cases, up to a twenty percent excess, on a stoichiometric, molar, basis. In most cases, a five to ten percent excess, on that basis, will be found suitable.

To avoid the possibility of side-reactions and/or decomposition, it is desirable to conduct the reaction at relatively low temperatures. The reaction generally is mildly exothermic. Consequently, it will generally be found best to add the alcohol slowly to the pyrophosphate, with thorough stirring and cooling as necessary to maintain the reaction mixture temperature at about 30–70° C. To insure complete reaction, the mixture then should be heated to about 70° C. and held there for from one to three hours. (The higher the molecular weight of the alcohol, the longer will be the reaction time needed, in general.)

Judging from the available evidence, it appears that alcohols, generally, are operable in this reaction. However, since mixed dialkyl enol phosphates are of most interest as insecticides and anthelmintics, the preferred alcohols are the alkanols.

Preparation of typical species of the anhydrides of the invention, and typical species of enol phosphate products therefrom according to the method of the invention, is demonstrated in the following examples. In these examples, "parts" means parts by weight unless otherwise indicated therein, with parts by weight bearing the same relationship to parts by volume as does the kilogram to the liter.

EXAMPLE I.—Preparation of P,P'-di(2,2-dichlorovinyl P,P'-dimethyl pyrophosphate (a) Preparation of methyl sodium 2,2-dichlorovinyl phosphate Sodium iodide and dimethyl 2,2-dichlorovinyl phosphate, in the molar ratio of 1:1.1 were dissolved in acetone. The solution was refluxed for 30 minutes, then cooled, partially stripped of acetone, and cooled in a Dry Ice/acetone bath. Methyl sodium 2,2-dichlorovinyl phosphate crystallized out, as a white solid melting at 213–214° C., with decomposition. It was identified by elemental analysis, and the identity was confirmed by infrared spectrum analysis.

(b) Preparation of methyl hydrogen 2,2-dichlorovinyl phosphate

Methyl sodium 2,2-dichlorovinyl phosphate was dissolved in methanol. A stoichiometrically equivalent amount of anhydrous hydrogen chloride was slowly introduced into the thoroughly stirred solution. The reaction was mildly exothermic, and the reaction mixture was cooled to maintain the mixture at 30° C. After addition of the hydrogen chloride, the mixture was stirred for an additional 15 minutes, then the precipitate of sodium chloride that had formed was filtered off. The liquid phase was stripped of methanol to leave a straw-colored oil, identified by elemental analysis and infrared spectrum analysis as methyl hydrogen 2,2-dichlorovinyl phosphate.

(c) Preparation of P,P'-di(2,2-dichlorovinyl) P,P'-dimethyl pyrophosphate 206.97 parts of methyl hydrogen 2,2-dichlorovinyl phosphate were mixed with 750 parts by volume of thionyl chloride, and the mixture was refluxed for 5 hours. The excess thionyl chloride then was stripped off at 45° C. and 20–25 torr. The residue was redissolved in carbon tetrachloride and then was re-stripped first at 45° C. and 20 torr, and then under high vacuum, to leave a straw-colored oil. This was distilled in a molecular still to a kettle temperature of 125° C., 0.0001 torr. The distillate was subjected to elemental analysis:

Analysis (percent by weight): P, 15.0; Cl, 35.1.
Calculated analysis for the anhydride: P, 15.7; Cl, 35.9.
The identity of the product was confirmed by infra-red spectrum analysis.

Nuclear magnetic resonance analysis indicated the product to contain 80–90% P,P'-di(2,2-dichlorovinyl) P,P'-dimethyl pyrophosphate.

EXAMPLE II.—Preparation of P,P'-di(2,2-dichlorovinyl) P,P'-dimethyl pyrophosphate 266 parts of methyl sodium 2,2-dichlorovinyl phosphate was dissolved in 500 parts by volume of thionyl chloride, and the mixture was heated to reflux and held there for 4 hours. The mixture then was cooled and excess thionyl chloride stripped off to 40° C. and 20 torr. The residue was diluted with methylene chloride and the sodium chloride filtered off and washed with methylene chloride. The methylene chloride solutions was combined, the methylene chloride stripped off under water aspirator vacuum, and the residue was twice distilled in a molecular still, to a kettle temperature of 125° C., 0.0004 torr. to give as product P,P'-di(2,2-dichlorovinyl) P,P'-dimethyl pyrophospate.

EXAMPLE III.—Preparation of methyl butyl 2,2-dichlorovinyl phosphate (a) 20 parts of P,P'-di(2,2-dichlorovinyl) P,P'-dimethyl pyrophosphate and 4.3 parts of n-butyl alcohol were mixed. Two drops of concentrated sulfuric acid was added. The solution warmed to 68° C. It was allowed to cool slowly, with stirring. Total reaction time was one hour. The mixture then was mixed with 150 parts by volume of methylene chloride and the combined mixture was washed twice with 50 parts by weight of aqueous sodium bicarbonate solution. The aqueous washings were extracted with methylene chloride, the methylene chloride solutions were combined, dried and the solvent stripped off under water aspirator vacuum at 35° C. The pale yellow oil product was Claisen distilled to a pot temperature of 118–122° C. 0.02 torr. It was identified as methyl butyl 2,2-dichlorovinyl phosphate by elemental analysis.

Analysis (percent by weight).—Calculated: P, 11.8; Cl, 27.0. Found: P, 12.0; Cl, 26.3.

The identity of the product was confirmed by infra-red spectrum analysis. Nuclear magnetic resonance analysis indicated the product to be more than 95% methyl butyl 2,2-dichlorovinyl phosphate.

(b) 123 parts of n-butanol was added slowly to 600 parts of P,P'-di(2,2-dichlorovinyl) P,P'-dimethyl pyrophosphate. The reaction was mildly exothermic, the reaction mixture temperature rising to 70° C., then allowed to fall to 60–65° C., where the stirred mixture was held for 3 hours. The mixture was cooled, was diluted with 1000 parts by volume of methylene chloride, was washed three times with 300 parts by volume of aqueous sodium bicarbonate solution. The aqueous phase was separated, extracted with 300 parts by volume of methylene chloride, the methylene chloride solutions were combined, dried, filtered and stripped under water aspirator vacuum to 35° C. The residue was distilled in a molecular still to 115° C., 0.0004 torr, the product of the distillation being methyl butyl 2,2-dichlorovinyl phosphate.

Analysis (percent by weight).—Calculated: P, 11.8; Cl, 27.0. Found: P, 11.4; Cl, 26.7.

This experiment established that use of the sulfuric acid as catalyst was not necessary.

EXAMPLE IV.—Preparation of methyl isobutyl 2,2-dichlorovinyl phosphate 39 parts of P,P'-(2,2-dichlorovinyl) P,P'-dimethyl pyrophosphate, 7.3 parts of isobutyl alcohol and 2 drops of concentrated sulfuric acid were mixed and the mixture heated to 68° C., then permitted to cool slowly to room temperature. Reaction time: 1 hour. The mixture then was diluted with methylene chloride and the resulting mixture washed twice with 50 parts by volume of 10% aqueous sodium carbonate solution. The aqueous washings were combined, and treated twice with 50 parts by volume of methylene chloride. The methylene chloride washings were combined, dried, filtered and stripped of solvent under water aspirator vacuum. The residue was distilled under vacuum, methyl isobutyl 2,2-dichlorovinyl phosphate being obtained as the fraction having a kettle temperature of 115–116° C., head temperature 95–97° C., 0.02 torr. The identity was established by elemental analysis:

Analysis (percent by volume).—Calculated: P, 11.8; Cl, 27.0. Found: P, 12.0; Cl, 26.3.

The identity was confirmed by infra-red spectrum analysis. Nuclear magnetic resonance indicated the product to be about 95% methyl isobutyl 2,2-dichlorovinyl phosphate.

EXAMPLE V.—Preparation of methyl heptyl 2,2-dichlorovinyl phosphate 87.2 parts of P,P'-di(2,2-dichlorovinyl) P,P'-dimethyl pyrophosphate and 23.2 parts by n-heptyl alcohol were mixed at 21° C. The solution was stirred, whereupon the temperature of the solution rose to 45° C., over a 5-minute period. The mixture then was heated to 70° C. and held there for 2.5 hours. The mixture then was cooled, diluted with methylene chloride to a total volume of about 200 parts by volume and treated with saturated sodium bicarbonate (five times with 40 parts by weight) until no further carbon dioxide evolved. The organic and aqueous phases were separated, the aqueous phase extracted with 200 parts by volume of methylene chloride. The two methylene chloride solutions were combined, dried, treated with celite and absorbent carbon and filtered, then stripped of methylene chloride and the residue distilled in a molecular still, methyl heptyl 2,2-dichlorovinyl phosphate being obtained as the fraction distilling at 90° C. at 0.0001 torr. The identity of the product was determined by elemental analysis:

*Analysis* (percent by weight).—Calculated: P, 10.2; Cl, 23.3. Found: P, 10.3; Cl. 24.1.

The identity was confirmed by infra-red spectrum analysis and by nuclear magnetic resonance, which indicated the product to be about 95% methyl heptyl 2,2-dichlorovinyl phosphate.

EXAMPLE VI—Preparation of other enol phosphate products

The following other enol phosphate products have prepared from P,P'-di(2,2-dichlorovinyl) P,P'-dimethyl pyrophosphates according to the techniques demonstrated in Examples I–V. The table indicates the boiling point of the product and comparison of the results of elemental analysis with the calculated analyses.

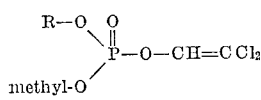

| R= | Boiling Point (° C.)/(torr) | Calculated P | Calculated Cl | Found P | Found Cl |
|---|---|---|---|---|---|
| Propyl | 110(0.0001) | 12.5 | 28.5 | 12.4 | 28.1 |
| Isopropyl | 79(0.04) | 12.5 | 28.5 | 12.7 | 28.3 |
| Sec-butyl | 85(0.0001) | 11.8 | 27.0 | 12.1 | 27.2 |
| Pentyl | 100(0.0001) | 11.2 | 25.6 | 11.3 | 25.6 |
| Isopentyl | 75(0.0001) | 11.2 | 25.6 | 11.4 | 25.9 |
| Hexyl | Crude | 10.7 | 24.4 | 11.1 | 24.3 |
| Octyl | Crude | 9.7 | 22.3 | 9.9 | 21.7 |
| Sec-octyl | 135(0.0001) | 9.7 | 22.3 | 9.9 | 21.9 |
| Nonyl | Crude | 9.3 | 21.3 | 9.7 | 21.8 |
| Decyl | 160(0.0001) | 8.9 | 20.4 | 8.7 | 20.8 |
| Undecyl | 125(0.0001) | 8.6 | 19.7 | 8.2 | 19.5 |
| Dodecyl | Crude | 8.3 | 18.9 | 8.3 | 19.0 |
| Hexadecyl | 175(0.0001) | 7.2 | 16.4 | 7.2 | 16.7 |
| 2-chloroethyl | 116.5(0.2) | 11.5 | 39.6 | 11.7 | 39.2 |
| 2-chloropropyl | Crude | 10.9 | 37.5 | 10.9 | 39.2 |
| 2-(methoxy)ethyl | 106–108(0.05) | 11.7 | 26.8 | 11.7 | 26.3 |
| 2-(2-methoxyethoxy)-ethyl | Crude | 10.1 | 23.0 | 10.5 | 22.4 |
| 2-(ethoxycarbonyl)-1-methylethyl | 130(0.0001) | 9.6 | 22.1 | 9.4 | 21.5 |

Other compounds of this class which can be prepared from the anhydrides of this invention include the following, for example:

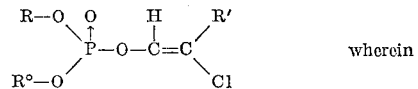 wherein

| R= | R°= | R'= | Precursor alcohol R°—OH |
|---|---|---|---|
| Methyl | Propyl | H | Propyl. |
| Do | Isopropyl | H | Isopropyl. |
| Do | Butyl | H | Butyl. |
| Do | Isobutyl | H | Isobutyl. |
| Do | do | Cl | Do. |
| Do | Hexyl | H | Heptyl. |
| Do | Undecyl | H | Undecyl. |
| Ethyl | Butyl | Cl | Butyl. |
| Do | Heptyl | Cl | Heptyl. |
| Do | do | H | Do. |
| Methyl | 2-ethylpentyl | Cl | 2-ethylpentanol. |
| Do | Allyl | Cl | Allyl. |
| Do | 2-(methylthio) ethyl | Cl | 2-(methylthio) ethyl. |
| Do | 4-(methylthio) benzyl | Cl | 4-(methylthio) benzyl. |
| Do | 4-(phenylthio) phenyl | Cl | 4-(phenylthio)-phenol. |
| Do | 4-(phenyl)phenyl | Cl | 4-phenylphenol. |
| Do | 2-(phenoxy)ethyl | Cl | 2-(phenoxy)ethyl. |
| Do | 2-cyanoethyl | Cl | 2-cyanoethyl. |
| Do | (CH₃)₂C=N— | Cl | Acetone oxime. |
| Do | 5-norbornen-2-ylmethyl | Cl | 5-norbornen-2-ylmethanol. |
| Do | 3-chlorosulfolan-5-yl | Cl | 3-chlorosulfolan-4-ol. |
| Do | Tetrahydrofuran-2-ylmethyl | Cl | 2-tetrahydrofurfuryl. |

EXAMPLE VII.—Preparation of P,P'-di-(2 - chloro-1-(2',4' - dichlorophenyl)vinyl) P,P'-diethyl pyrophosphate 2-chloro-1-(2',4'-dichlorophenyl)vinyl ethyl hydrogen phosphate was prepared from 2-chloro-1-(2',4'-dichlorophenyl)vinyl diethyl phosphate by the general procedure described in Example I, *a* and *b*.

2.6 parts of the hydrogen phosphate was dissolved in 40 parts by volume of dry ether and 0.7 part of dicyclohexylcarbodiimide in 10 parts by volume of dry ether was added to the solution. After 15 minutes, the solution was evaporated to 25 parts by volume, the mixture was filtered to remove crystals of dicyclohexylurea, and the filtrate was allowed to stand overnight at 2° C., yielding 1.7 parts (65% yield) of colorless crystals, melting point: 97° C., identified by elemental analysis as P,P'-di-(2 - chloro-1-(2',4'-dichlorophenyl)vinyl) pyrophosphate.

*Analysis* (percent by weight).—Calculated: P, 9.6; Cl. 33.0. Found: P, 9.6; Cl. 32.7.

Other compounds of this class which can be prepared from anhydrides of this invention include the following, for example:

Compounds defined by Formula IV wherein R° is one of the groups, R°, described in Example VI, derived from the appropriate precursor alcohols, R°—OH, and

| R= | R⁴= | R'= | X | hal= |
|---|---|---|---|---|
| Methyl | 2,4,5-trichlorophenyl | H | O | Cl |
| Ethyl | do | H | O | Cl |
| Methyl | 2,5-dichlorophenyl | H | O | Cl |
| Do | do | H | S | Cl |
| Ethyl | do | H | S | Cl |

Other typical compounds which can be prepared from anhydrides of this invention include the following:

Compounds defined by Formula II wherein R° is one of the groups, R°, described in Example VI, derived from the appropriate precursor alcohol, R°—OH, and

| R= | R'= | R''= | X= |
|---|---|---|---|
| Methyl | H | Methyl | O |
| Ethyl | H | do | O |
| Methyl | H | Alpha-methylbenzyl | O |
| Ethyl | H | do | O |

Compounds defined by Formula III wherein R° is one of the groups, R°, described in Example VI, derived from the appropriate precursor alcohol, R°—OH, and

| R= | R'= | R²= | R³= | X= |
|---|---|---|---|---|
| Methyl | H | H | H | O |
| Ethyl | H | H | H | O |
| Methyl | Cl | H | H | O |
| Ethyl | Cl | H | H | O |
| Methyl | H | Methyl | H | O |
| Ethyl | H | do | H | O |
| Methyl | Cl | do | H | O |
| Ethyl | Cl | do | H | O |
| Methyl | H | do | Methyl | O |
| Ethyl | H | do | do | O |
| Methyl | Cl | do | do | O |
| Ethyl | Cl | do | do | O |

I claim as my invention:

1. Enol phosphate anhydrides of the formulae:

(a) 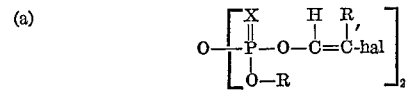

(b) 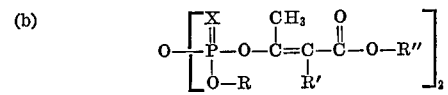

(c) 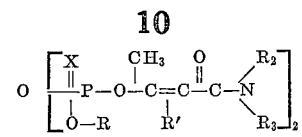

(d) 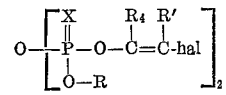

wherein R is alkyl containing 1 to 4 carbon atoms; R' is hydrogen or middle halogen; R'' is methyl, phenyl and phenalkyl wherein the alkyl moiety of the phenalkyl group containing no more than 4 carbon atoms; $R_2$ and $R_3$ each is hydrogen or lower alkyl and $R_4$ is phenyl substituted by up to 3 halogen atoms and X is oxygen or sulfur.

2. Anhydrides according to claim 1 wherein R is methyl.

3. Anhydrides according to Formula (a), claim 1, wherein R is methyl, R' is chlorine.

References Cited

UNITED STATES PATENTS 2,571,656   10/1951   Bell et al. ‑‑‑‑‑‑‑‑‑‑ 260—971

CHARLES B. PARKER, Primary Examiner

A. H. SUTTO, Assistant Examiner

U.S. Cl. X.R.

260—940, 941, 943, 957, 971, 988; 424—210, 211, 212, 219